US012638148B2

(12) United States Patent
Allison et al.

(10) Patent No.: US 12,638,148 B2
(45) **Date of Patent: *May 26, 2026**

(54) ELEVATED STRUCTURE-MOUNTED LIGHTING SYSTEM

(71) Applicant: C&M OILFIELD RENTALS, LLC, Cody, WY (US)

(72) Inventors: Joshua C. Allison, Cody, WY (US); Josh Haaland, Cody, WY (US); Jessica Ivanoff, Cody, WY (US)

(73) Assignee: C&M OILFIELD RENTALS, LLC, Cody, WY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/316,771

(22) Filed: May 12, 2023

(65) Prior Publication Data

US 2023/0288038 A1 Sep. 14, 2023

Related U.S. Application Data

(63) Continuation of application No. 17/179,064, filed on Feb. 18, 2021, now Pat. No. 11,725,790, which is a continuation of application No. 17/157,590, filed on Jan. 25, 2021, now Pat. No. 11,300,260, which is a continuation of application No. 16/571,527, filed on (Continued)

(51) Int. Cl.

| | |
|---|---|
| ***F21S 8/08*** | (2006.01) |
| ***F21V 21/116*** | (2006.01) |
| ***F21V 33/00*** | (2006.01) |
| *F21W 131/10* | (2006.01) |
| *F21W 131/402* | (2006.01) |
| *F21W 131/403* | (2006.01) |

(52) U.S. Cl.

CPC ............. *F21S 8/088* (2013.01); *F21V 21/116* (2013.01); *F21V 33/00* (2013.01); *F21W 2131/1005* (2013.01); *F21W 2131/402* (2013.01); *F21W 2131/403* (2013.01)

(58) Field of Classification Search

CPC ........................................................ F21S 8/088

See application file for complete search history.

(56) References Cited

U.S. PATENT DOCUMENTS 2,895,039 A * 7/1959 Hutchison ............... F21V 21/34 362/426

6,957,832 B1 * 10/2005 Pannekoek ............. F21V 21/36 285/414

(Continued)

OTHER PUBLICATIONS

Swivelpole™ Catalog printed Mar. 2014 (Year: 2014).*

(Continued)

*Primary Examiner* — Zheng Song

(74) *Attorney, Agent, or Firm* — Morgan, Lewis & Bockius LLP

(57) ABSTRACT

An improved elevated structure-mounted lighting system is disclosed. The lighting system may be used on drilling rigs, or with other applications, including for drilling, production, refineries, frac sites, construction, and other industrial applications that may use tower/mast type equipment. The improved elevated structure-mounted lighting system may accommodate any style or design of crown section of a drilling rig and may be mounted on a pole or independent mount system.

31 Claims, 8 Drawing Sheets

Related U.S. Application Data

Sep. 16, 2019, now Pat. No. 10,900,626, which is a continuation of application No. 16/138,723, filed on Sep. 21, 2018, now Pat. No. 10,473,282, which is a continuation-in-part of application No. 16/009,032, filed on Jun. 14, 2018, now Pat. No. 10,711,961.

(60) Provisional application No. 62/643,663, filed on Mar. 15, 2018.

(56) References Cited

U.S. PATENT DOCUMENTS

| | | | | |
|---|---|---|---|---|
| 8,814,221 | B2 * | 8/2014 | Grant | H02G 11/00 285/153.1 |
| 11,111,761 | B1 * | 9/2021 | Gowanlock | F21V 21/30 |
| 2008/0266859 | A1 * | 10/2008 | Palmisano | F21V 17/007 362/249.07 |
| 2015/0184840 | A1 * | 7/2015 | Gowanlock | F21V 21/30 362/249.07 |

OTHER PUBLICATIONS

Swivelpole Catalog printed Mar. 2014 (refer to IDS filed Apr. 16, 2021 in parent Case U.S. Appl. No. 17/179,064) (Year: 2014).*
Patent Board Decision of Inter Partes Review of U.S. Pat. No. 10,900,626 (Year: 2024).*

* cited by examiner

ELEVATED STRUCTURE-MOUNTED LIGHTING SYSTEM

TECHNICAL FIELD

The present application relates to lighting systems, and more particularly, to lighting systems that may be used for a drilling application.

BACKGROUND

Lighting systems for drilling rigs and their surrounding areas are critical to ensure continuous and safe operation of well sites. To ensure even and effective lighting of the well site, lighting systems have previously been installed on the uppermost portion of the drilling rig, also referred to as the "crown" of the rig. Prior art crown-mounted lighting systems developed for oil rigs are limited in several ways. Their designs are complicated and designed for specific rigs or rig types. Typically, once they are designed for a particular rig or a particular type of rig, the lighting systems designs are limited and are not able to be adapted for other uses.

Prior art lighting systems for drilling rigs are fixed, monolithic structures that are typically crown or frame systems, with a single size and layout accommodating one type of light and rig. Because they are a single structural unit, they are heavy and typically require cranes along with multiple workers for installation, removal, and adjustments. A typical rig lighting frame system may require between 6 and 12 hours for installation. Further, before a derrick can be moved, the lighting systems must be removed—again with all of the necessary equipment and personnel—and a similar amount of time may be required for uninstallation. These installation and uninstallation times extend the time needed between rig deployments. Due to the high cost of operating a rig, any such delay is extremely inefficient for the operator of a wellsite. These factors also increase the time required to be spent on maintaining these systems, which also increases safety risk.

SUMMARY

An improved elevated structure-mounted lighting system is disclosed. In addition to being used on rigs, embodiments of the lighting system may be used with different applications, including for drilling, production, refineries, frac sites, construction, and other industrial applications that may use tower/mast type equipment. The improved elevated structure-mounted lighting system may accommodate any style or design of crown section of a drilling rig and may be mounted on a pole or independent mount system.

BRIEF DESCRIPTION OF THE DRAWINGS

Embodiments of the present invention are described with reference to the following figures. The same numbers are used throughout the figures to reference like features and components. Various embodiments may utilize elements and/or components other than those illustrated in the drawings, and some elements and/or components may not be present in various embodiments. Elements and/or components in the figures are not necessarily drawn to scale.

DETAILED DESCRIPTION

Figure 1:
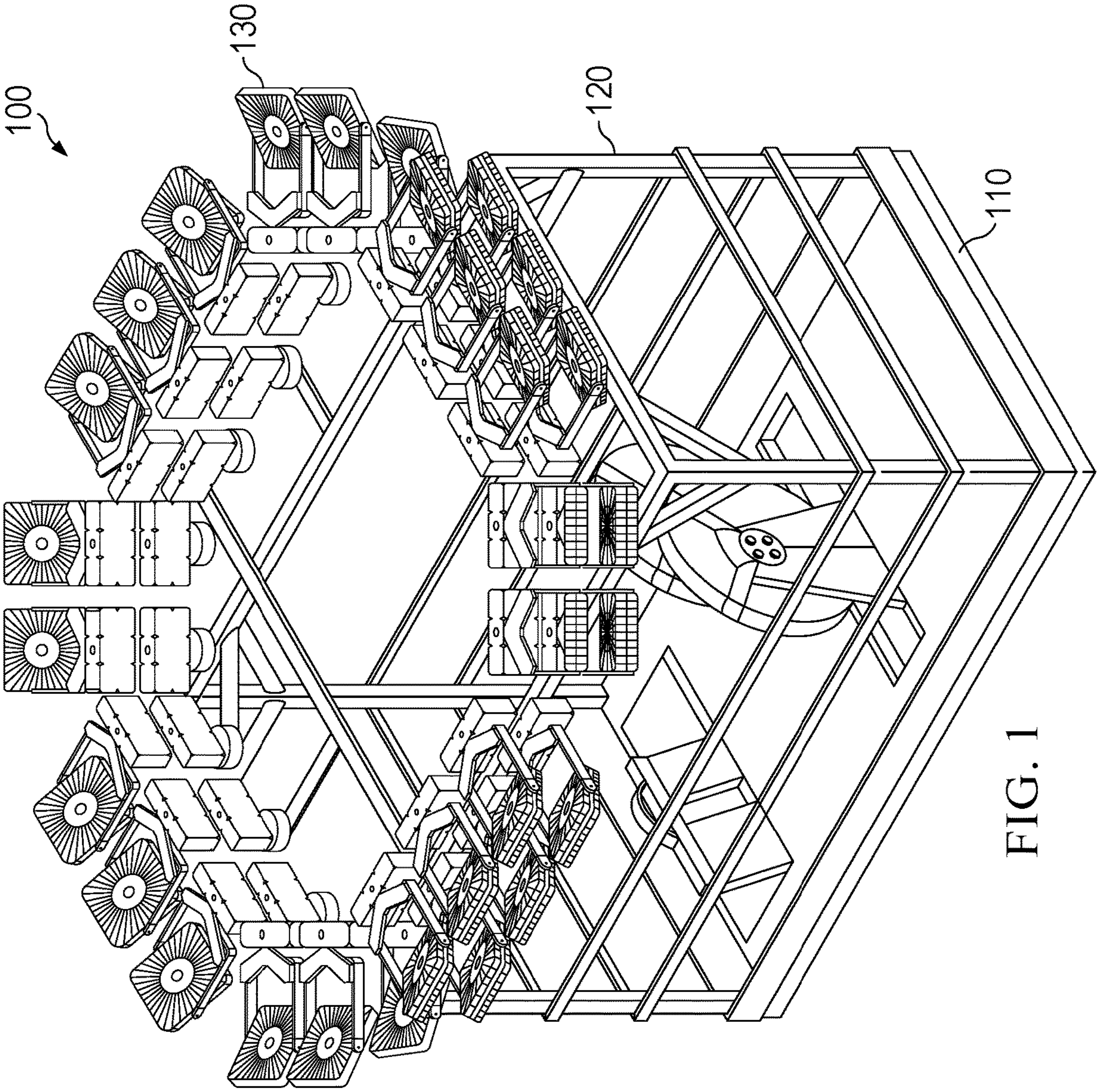
FIG. 1 illustrates a prior art crown-mounted frame-based lighting system.

FIG. 1 illustrates a prior art lighting system 100. The prior art lighting system is built from a single frame 120 which includes multiple frame lights 130. The frame lights 130 are rigidly fixed onto the frame 120 and cannot be adjusted or repositioned. The frame 120 includes the electrical connections for the lights. The frame 120 may be installed on the crown 110, or top, of a drilling rig such that the ground around the drilling rig is illuminated when in use.

Figure 2:
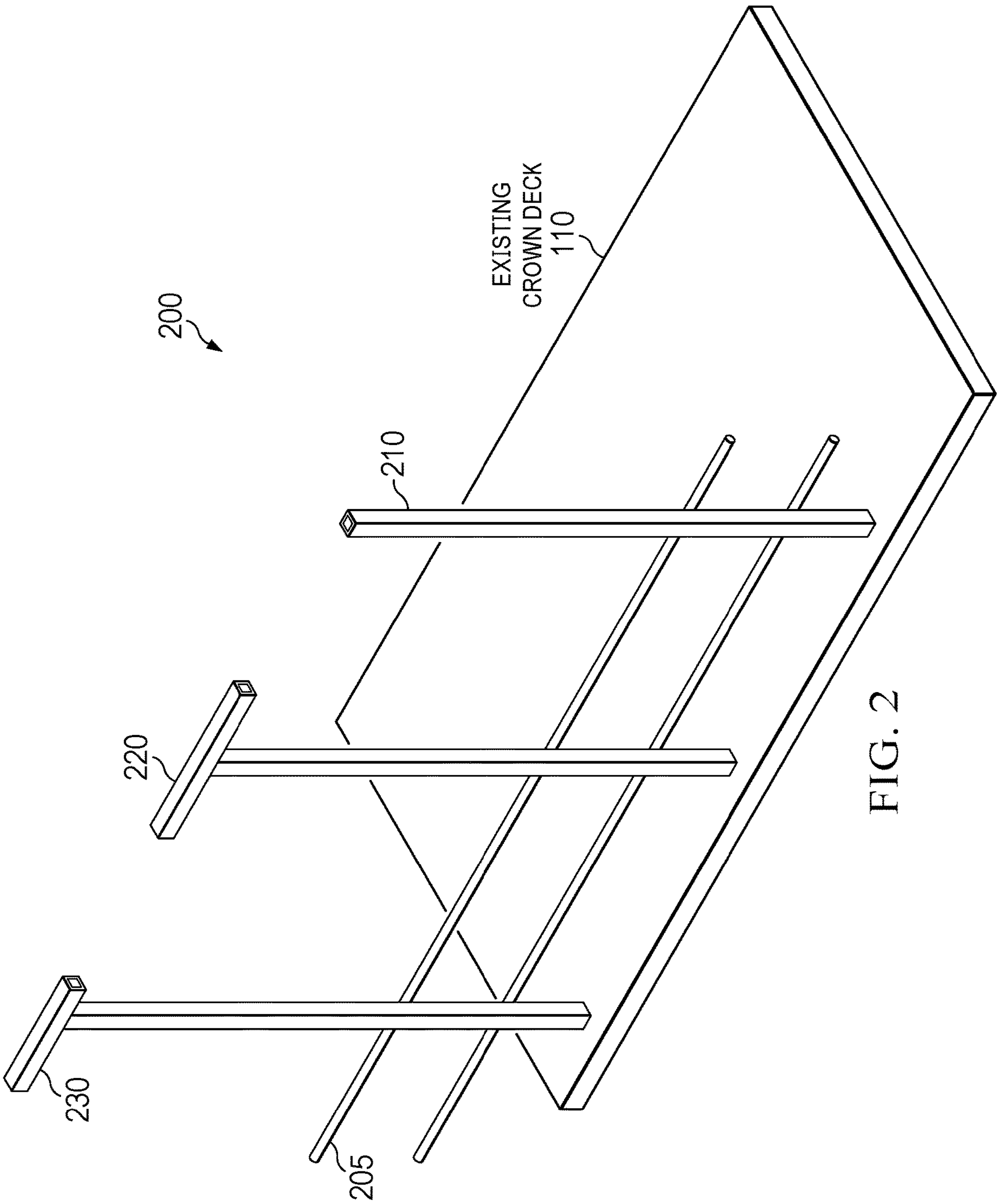
FIG. 2 shows a three-dimensional isometric view of three embodiments of the improved elevated structure-mounted lighting system that are depicted relative to a crown deck.
Figure 3:
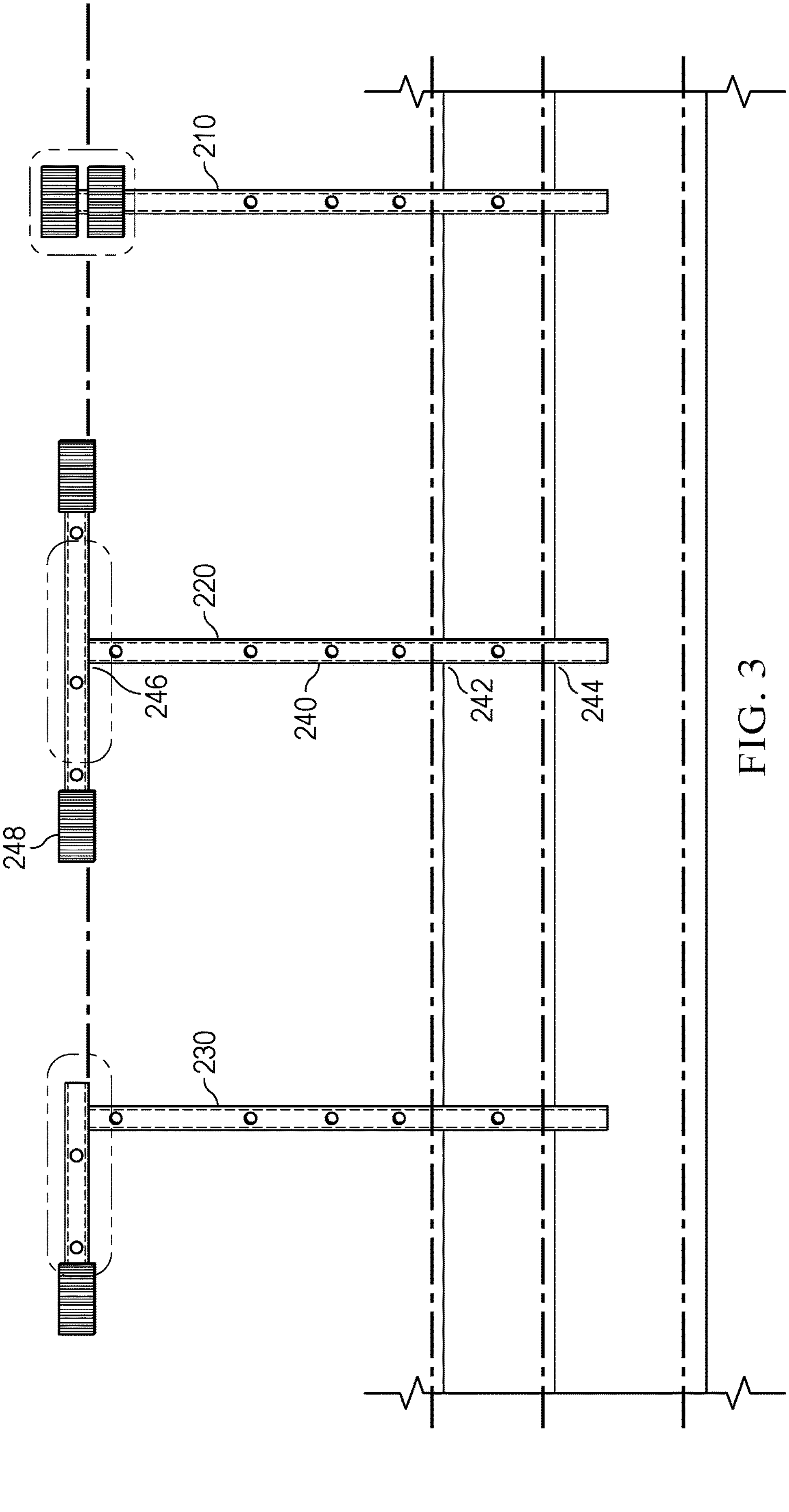
FIG. 3 illustrates an elevation view of three embodiments of the improved elevated structure-mounted lighting system that are depicted relative to a crown deck.

FIG. 2 shows a three-dimensional isometric view and FIG. 3 shows an elevation view of three embodiments of the improved elevated structure-mounted lighting system 200 that are depicted relative to a crown deck. The embodiments of the lighting system 200 may be mounted on the crown deck of a drilling rig or on other elements of a frame structure. The lighting system 200 is lightweight in design and may be manufactured using any type of metal, including aluminum, steel, carbon, hot roll, etc. The frame structure may be hollow to reduce weight. The lighting system is also modular, which allows it to be assembled on site without the use of heavy equipment, cranes, harnesses, supports, cables, etc. This reduces the risk of accidents and the time and costs associated with the same. In an embodiment, a pole-mounted design may be set up by two people in under one hour. The system may accommodate a variety of different light types, with differing luminosities and power consumption, that may be selected based on the particular application. Variations of light types may include combustion-proof and/or LED lights.

The lighting system 200 is modular and assembled using multiple standalone pieces that may be configured to different structures. Three lighting unit embodiments from FIGS. 2 and 3 are shown in an I-shape 210, T-shape 220, and L-shape 230, but this is not limiting and other configurations or modifications may be used, due in part to the modular nature of the system. There is no master frame or master support structure, which allows for configurability and customization.

As shown in FIG. 3, the light units 210, 220, and 230 may include a mounting pole 240, a bracket for a top rail 242, a bracket for a bottom rail 244, a cap 246, and a light fixture 248. The bracket for a top rail 242 and bracket for a bottom rail 244 may be used to attach the light mounting pole 240 to rails 205 of a crown deck of a drilling rig using U-shaped bolts or straps, as shown in FIG. 2. The straps are wrench-type straps that may be made out of a plastic composite. In another embodiment, the mounting pole 240 may be welded directly to the drilling rig crown or other structure.

Figure 6:
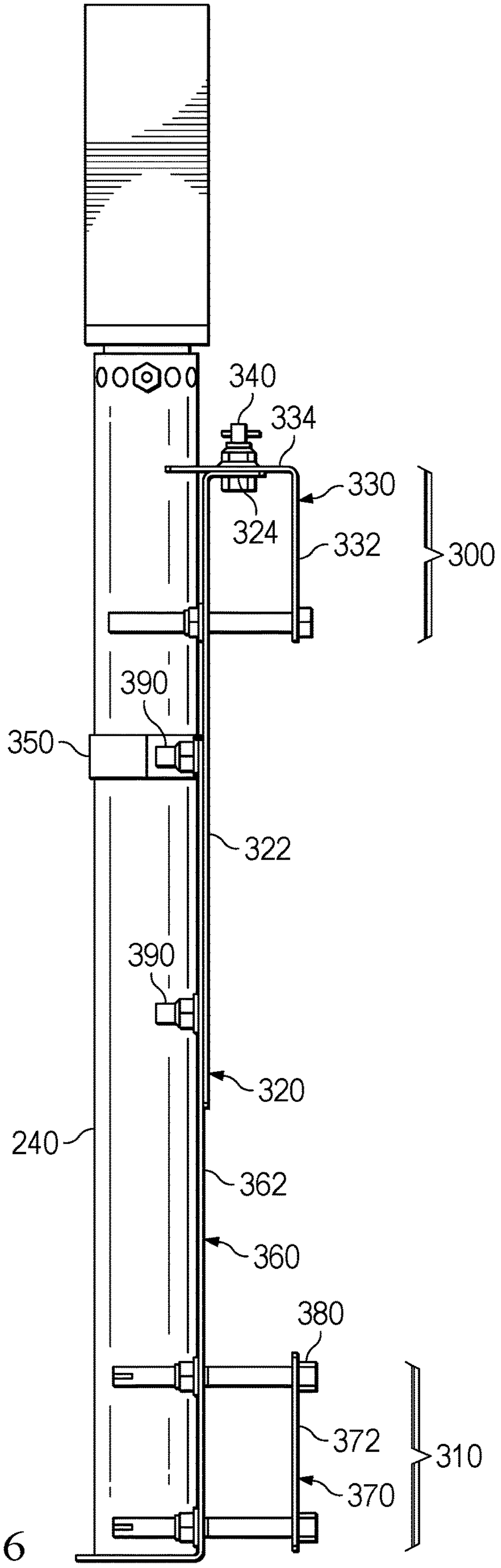
FIG. 6 is a side view of an embodiment of a light fixture mounting pole.

In the alternative embodiment shown in FIG. 6, mounting pole 240 may be attached to the crown deck or other structure using brackets 300 and 310 that attach to top rail 242 and bottom rail 246 respectively. In this particular embodiment, bracket 300 comprises a top mount plate 320 and a top rail clamp 330, while bracket 310 comprises bottom mount plate 360 and clamp plate 370. One benefit of this alternative embodiment is allowing the use of shorter mounting poles, which thereby reduces the overall weight of the system. As shown more clearly in FIG. 7A, top mount plate 320 includes a vertical portion 322 that is substantially parallel to the central axis of mounting pole 240 and a horizontal portion 324 that is substantially parallel to the top surface of top rail 242. Similarly, top rail clamp 330 includes a vertical portion 332 that is substantially parallel to the central axis of mounting pole 240 and a horizontal portion 334 that is substantially parallel to the top surface of top rail 242. The horizontal portions of top mount plate 320 and top rail clamp 330 are connected together, as for example by one or more bolts, as shown in FIG. 7. Alternatively, as shown in FIG. 7A, top mount plate 320 and top rail clamp 330 may be combined into a single component that hooks over the top of top rail 242.

Mounting pole 240 is held in place and attached to top rail 242 by the use of one or more bolts 340, which are inserted through both top mount plate 320 and top rail clamp 330. In the embodiment of FIG. 7A with no separate top rail clamp, bolt(s) 340 are inserted through both vertical portions of top mount plate 320.

Mounting pole 240 may be further held in position using one or more tube clamps 350, which are bolted or otherwise connected to top mount plate 320 and/or bottom mount plate 360.

Figure 7A:
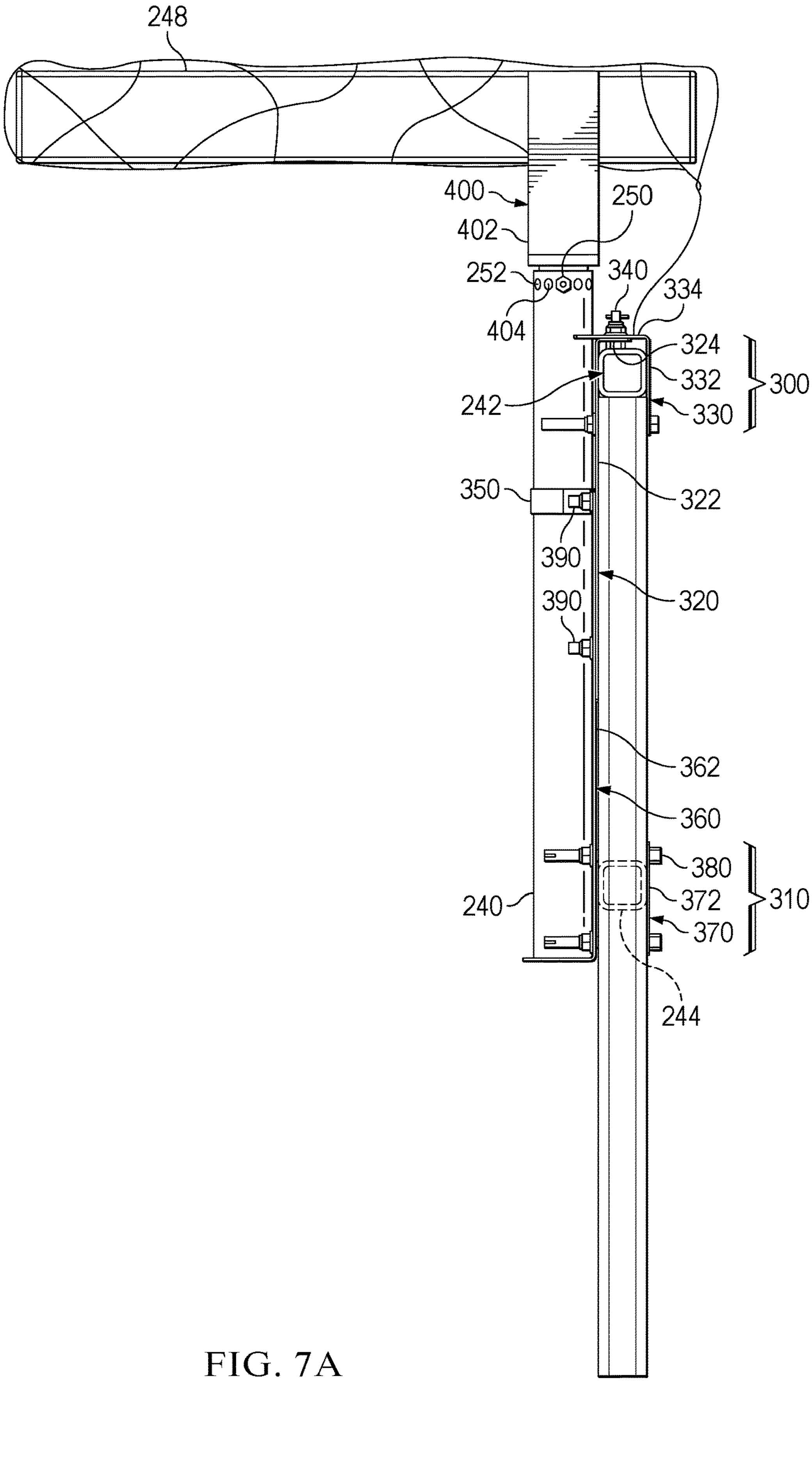
FIG. 7A is a side view of the embodiment of FIG. 6 with a light fixture that is attached to rails.
Figure 7B:
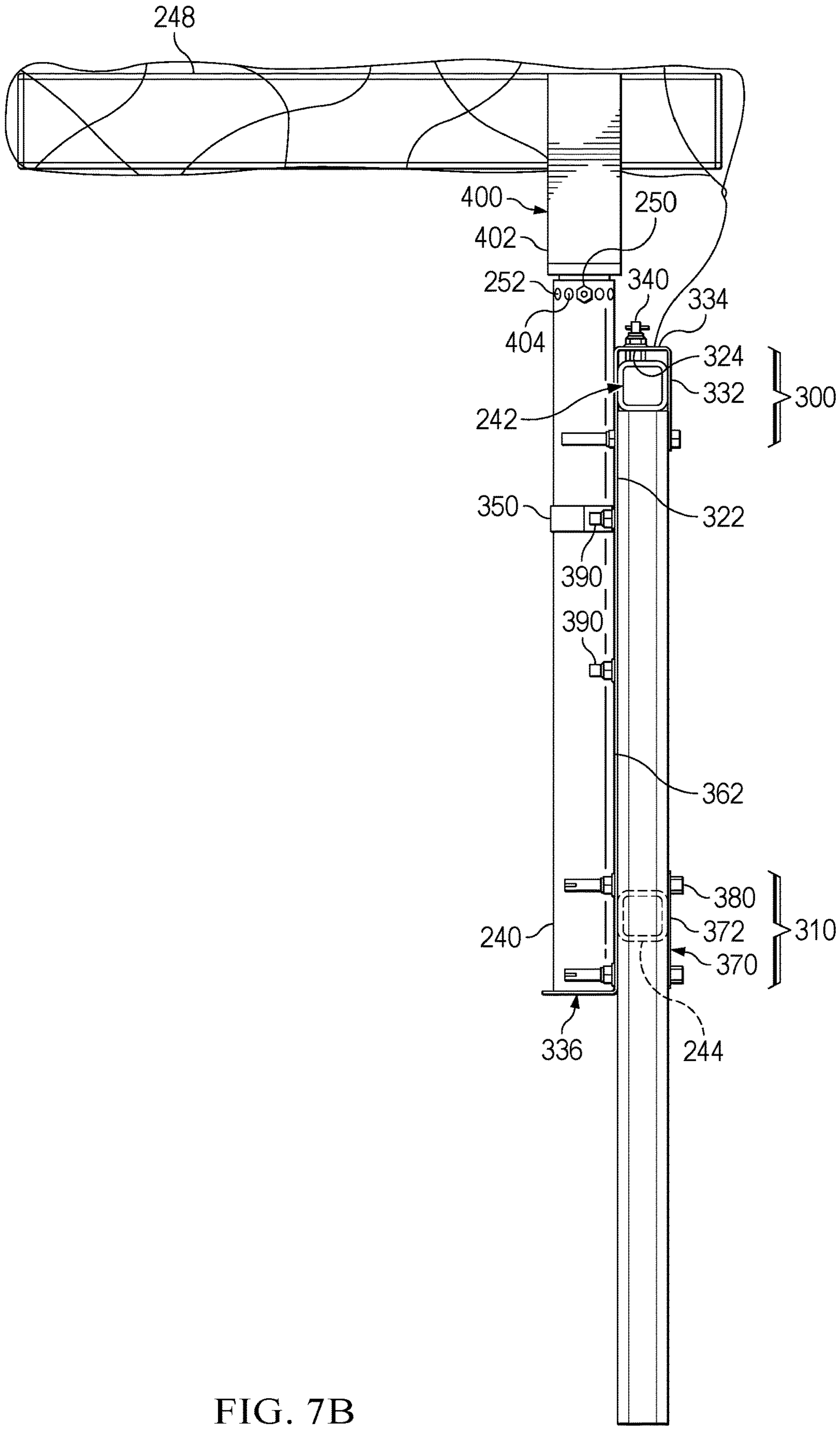
FIG. 7B is a side view of the embodiment with a single mounting plate.

Also as shown in FIG. 7A, bottom mount plate 360 includes a vertical portion 362 that is substantially parallel to the central axis of mounting pole 240. Optionally (but not shown), bottom mount plate 360 may also include a horizontal portion that is substantially parallel to the bottom of bottom rail 244. Clamp plate 370 also includes a vertical portion 372 that is substantially parallel to the central axis of mounting pole 240. Also, optionally (but not shown), clamp plate 360 may include a horizontal portion that is substantially parallel to the bottom of bottom rail 244. Alternatively, as shown in FIG. 7B, bottom mount plate 360 and clamp plate 370 may be combined into a single component 336 that hooks over the bottom of bottom rail 242. In FIG. 7B, bolt 340 may be optional.

Mounting pole 240 is held in place and attached to bottom rail 244 by the use of one or more bolts 380, which are inserted through both bottom mount plate 360 and clamp plate 370. In the embodiment of FIG. 7A with no separate clamp plate, bolt(s) 380 are inserted through both vertical portions of bottom mount plate 360. Mounting pole 240 may be further held in position using tube clamp 350, which is also bolted or otherwise connected to mount plate 320.

As shown in FIG. 6, top mount plate 320 and bottom mount plate 360 are also connected to each other, using one or more bolts 390 or other fastening devices, providing further stability and for this alternative embodiment.

Figure 8:
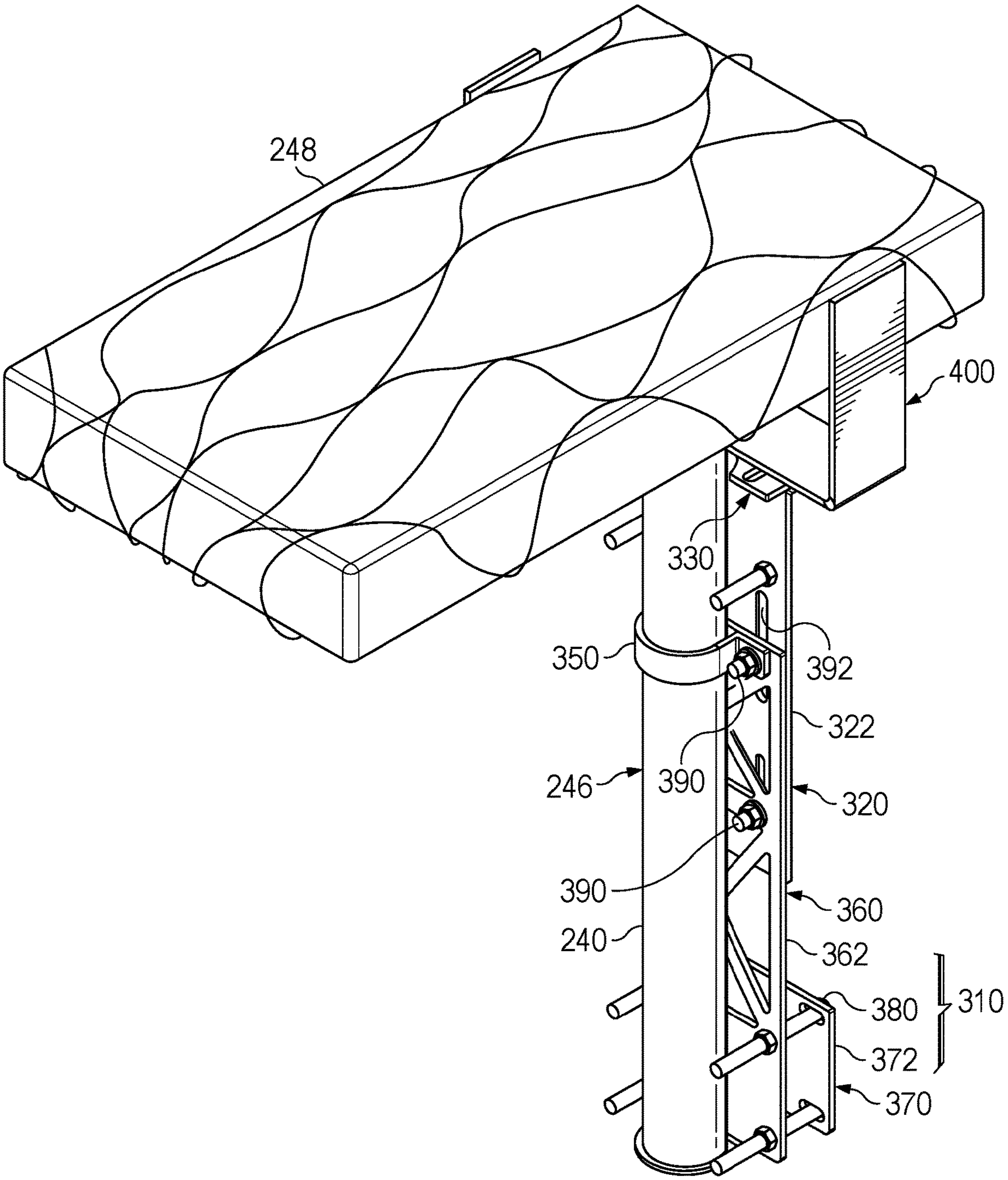
FIG. 8 is a perspective view of the embodiment of FIG. 6.

In addition, top mount plate 320 and bottom mount plate 360 may be configured with one or more vertically extending apertures 392 (as shown in FIG. 8), allowing the two mount plates to be moved vertically in relation to each other, while still providing the ability to insert bolt(s) 390 or other fastening devices through both mount plates. The vertically extending apertures 392 thus allow this alternative embodiment to be used on crown decks or other structures with a wide range of different dimension and configurations.

Figure 4A:
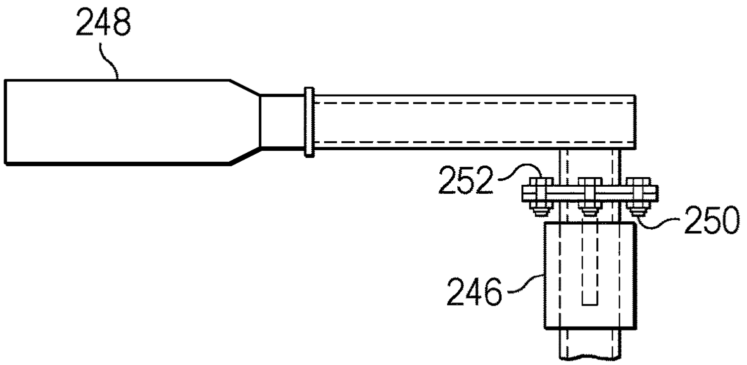
FIGS. 4A and 4B are enlarged views of two embodiments of a light fixture and cap of a light unit of the improved elevated structure-mounted lighting system.
Figure 4B:
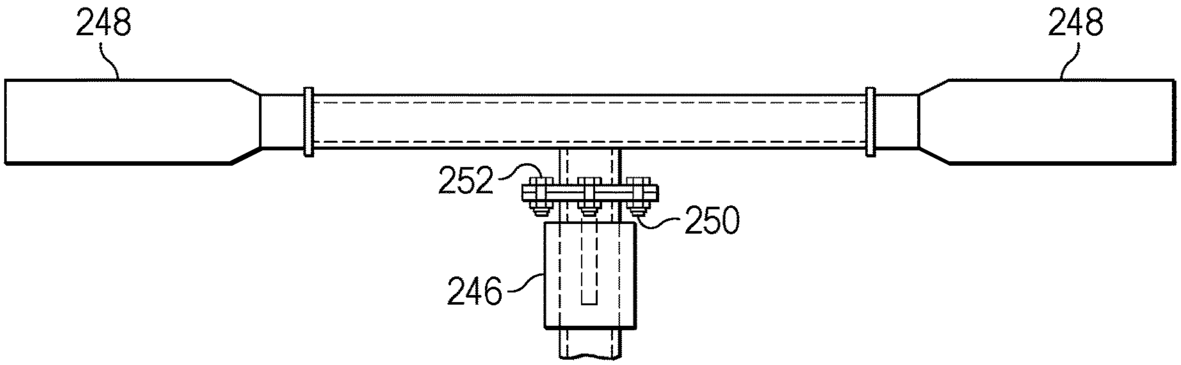
Figure 5:
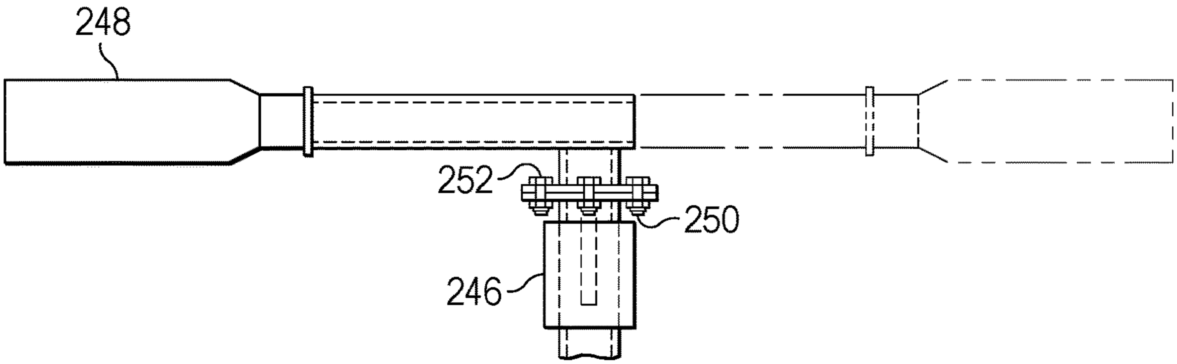
FIG. 5 is an enlarged view of an embodiment of a light fixture and a cap of a light unit illustrating different positions of the light fixture.

The light fixture 248 connects structurally and electrically to the cap 246, which houses wiring to accommodate any light fixture 248 that may be attached. Referring to FIGS. 4A and 4B, the light fixture 248 may be bolted to the cap 246, but is preferably connected to the cap using a pin-based engagement. The pins 250 may be removable. Once the light fixture 248 is engaged with the cap 246 such that pinholes 252 are aligned, one or more pins 250 may be inserted to securely connect the light fixture 248 to the cap 246. Because the pins 250 are removable, the light fixture 248 may be disconnected and removed from the cap 246 by removing the pins 250. The light fixture 248 and cap 246 are preferably structured so that the light fixture 248 may be engaged with the cap 246 to face outward (as shown in FIG. 4A) or to face inward (as shown in FIG. 5). This may be accomplished by aligning the pinholes 252 in at least a first position or in a second position. The light fixture 248 may be configured in the outward position for use and installed in the inward position for transport.

Based on the design, more than two positions may be contemplated. For example, as shown in FIG. 7A, mounting pole 240 may be configured with a plurality of pinholes 252. In this embodiment, where mounting pole 240 is cylindrical, pinholes 252 may be radially spaced around the circumference of mounting pole 240. In addition, light fixture 248 may be connected to cap 246 by the use of light bracket 400. In this embodiment, as shown in FIG. 7A, light bracket 400 comprises a generally cylindrical portion 402, which extends telescopically into at least the upper portion of mounting pole 240. In addition, cylindrical portion 402 is configured with one or more pinholes 404 which are configured to be aligned with the one or more pinholes 252 on mounting pole 240. In this way, pin(s) 250 may be used to maintain light fixture 248 in a plurality of different positions simply by removing pin 250 rotating the light bracket 400 until pinhole 404 aligns with a different pinhole on mounting pole 240, and reinserting pin 250 in the new position.

Safety cables connected between the light fixture 248 and cap 246 may be used as a backup in the event that pins 250 back out or are sheared during an extreme weather condition.

With prior art lighting systems, when a square frame is mounted, the lights are also fixed and cannot be moved as they are attached to the frame as a single unit. In contrast, in the improved elevated structure-mounted lighting system, each light may be mounted on a standalone base, and does not have to be attached to a master frame. Referring back to FIGS. 2 and 3, multiple light units 210, 220, and 230 may be installed on a crown in different configurations.

Accordingly, the lights may be individually shifted up, down, left, or right. Based on the location of a light unit 210, 220, or 230, if more surface area is required to be lit on a particular side, the lights may be configured and directed in that direction, or the light pole may be adjusted to achieve optimal surface lighting. Individual LED bulbs may be angled in a way to produce the greatest amount of light without dissipation. In an embodiment, efficient lights allow the lighting system to be run from 120V or 240V. The lights may come with dimmer, solar, and/or sensor options. These factors allow for lighting to be achieved more efficiently than prior art lighting systems.

Metal safety nets may also be affixed to the crown below the light units 210, 220, and 230. In additional to its modular frame design, the lighting system 200 may use consistent nut and bolt sizes, which allows flexibility and interoperability in its structural design and assembly.

The modular nature of the improved elevated structure-mounted lighting system also allows for it to be serviced or adjusted while it is erect and installed. There is a single cable to connect to a power source from crown to ground. At the lighting junction box, 12 quarter turn Appletons may be used. Woodhead plugs may also be used on the junction box. Further, the improved elevated structure-mounted lighting system does not have to be removed or taken down when the derrick or other applications are being transported or moved, which is allowed because the cords may be disconnected, rather than removed, during transport. Once transport is complete, the cords may be reconnected. Other features, such as an explosion-proof control panel on the ground with power switches may be used. As noted above, due to the high costs of rig operation, reducing time for installation and maintenance and improving safety are significant factors to reducing operation costs.

Many modifications and other implementations beyond those set forth herein will be apparent having the benefit of the teachings presented in the foregoing descriptions and the associated drawings. Therefore, it is to be understood that the systems and methods described herein are not to be limited to the specific implementations disclosed and that modifications and other implementations are intended to be included within the scope of the appended claims. Although specific terms are employed herein, they are used in a generic and descriptive sense and not for purposes of limitation.

The invention claimed is:

1. A modular lighting system for a rig comprising a crown deck with a walking surface and a handrail, the modular lighting system comprising:

- a plurality of light units, each light unit structurally independent from the other light units, and configured to be separately attached to the crown deck such that the position of each light unit in relation to the crown deck is independent of the position of other light units, each light unit comprising:
  - an elongate member configured to be attached to the crown deck of the rig and extending above the crown deck; and
  - a light fixture structurally coupled to the elongate member, the light fixture comprising one or more lights.

2. The lighting system of claim 1, wherein the elongate members are configured to extend above a top portion of the handrail of the crown deck.

3. The lighting system of claim 1, wherein the light fixtures are configured to be positioned above a top portion of the handrail of the crown deck.

4. The lighting system of claim 1, wherein the elongate members have a proximal end that is configured to be attached to the crown deck.

5. The lighting system of claim 4, wherein the elongate members have a distal end and the light fixtures are structurally coupled to the distal ends of the elongate members.

6. The lighting system of claim 1, wherein the light fixtures are structurally coupled to the elongate members using one or more bolts.

7. The lighting system of claim 1, wherein the light fixtures each comprise a bracket, and the light fixtures are structurally coupled to the elongate members using the brackets.

8. The lighting system of claim 1, wherein the light fixtures may be structurally coupled to the elongate members in two or more positions.

9. The lighting system of claim 8 wherein the one or more lights of the light fixture are configured to be oriented away from the rig in one of the two or more positions.

10. The lighting system of claim 8, wherein the one or more lights of the light fixture are configured to be oriented towards the rig in one of the two or more positions.

11. The lighting system of claim 1, wherein the elongate members are configured to be attached to the crown deck using brackets.

12. The lighting system of claim 11, wherein the brackets are configured to be welded to the crown deck.

13. The lighting system of claim 11, wherein the brackets are configured to be attached to the crown deck using bolts.

14. The lighting system of claim 1, further comprising safety nets configured to be connected to the rig.

15. The lighting system of claim 1, further comprising safety cables configured to connect the light fixtures to the rig.

16. The lighting system of claim 1, wherein the elongate members are configured to be attached to the handrail.

17. The lighting system of claim 1, wherein the elongate members comprise mounting poles.

18. A modular lighting system for a rig comprising a crown deck with a walking surface and a handrail, the modular lighting system comprising:

- a plurality of light units, each light unit structurally independent from the other light units and configured to be separately attached to the crown deck of the rig, each light unit comprising:
  - a unitary elongate member configured to be attached to the crown deck of the rig and extend above the crown deck;
  - a light fixture structurally coupled to the unitary elongate member, the light fixture comprising one or more lights;
  - wherein the unitary elongate member of each light unit is configured to extend above the top portion of the handrail of the crown deck, and the light fixture of each light unit is configured to be positioned above the top portion of the handrail.

19. The lighting system of claim 18, wherein the elongate members have a proximal end that is configured to be attached to the crown deck.

20. The lighting system of claim 19, wherein the elongate members have a distal end and the light fixtures are structurally coupled to the distal ends of the elongate members.

21. The lighting system of claim 18, wherein the light fixtures may be structurally coupled to the elongate members in two or more positions.

22. The lighting system of claim 21 wherein the one or more lights of the light fixture are configured to be oriented away from the rig in one of the two or more positions.

23. The lighting system of claim 21, wherein the one or more lights of the light fixture are configured to be oriented towards the rig in one of the two or more positions.

24. The lighting system of claim 18, wherein the elongate members are configured to be attached to the crown deck using brackets.

25. The lighting system of claim 24, wherein the brackets are configured to be welded to the crown deck.

26. The lighting system of claim 24, wherein the brackets are configured to be attached to the crown deck using bolts.

27. The lighting system of claim 18, wherein each light fixture comprises a bracket, and the light fixtures are structurally coupled to the elongate members using the brackets.

28. The lighting system of claim 18, further comprising safety nets configured to be connected to the rig.

29. The lighting system of claim 18, further comprising safety cables configured to connect the light fixtures to the rig.

30. The lighting system of claim 18, wherein the elongate members are configured to be attached to the handrail.

31. The lighting system of claim 18, wherein the elongate members comprise mounting poles.

* * * * *